(12) United States Patent
Diachina et al.

(10) Patent No.: US 9,445,215 B2
(45) Date of Patent: Sep. 13, 2016

(54) MTC DEVICE BANDWIDTH REDUCTION

(75) Inventors: John Diachina, Garner, NC (US);
Lars-Bertil Olsson, Angered (SE);
Paul Schliwa-Bertling, Ljungsbro (SE);
Andreas Bergström, Vikingstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 500 days.

(21) Appl. No.: 13/047,905

(22) Filed: Mar. 15, 2011

(65) Prior Publication Data

US 2011/0264740 A1  Oct. 27, 2011

Related U.S. Application Data

(60) Provisional application No. 61/326,495, filed on Apr. 21, 2010.

(51) Int. Cl.
*H04W 72/04* (2009.01)
*H04W 4/00* (2009.01)

(52) U.S. Cl.
CPC ........... *H04W 4/005* (2013.01); *H04W 72/048* (2013.01)

(58) Field of Classification Search
None
See application file for complete search history.

(56) References Cited

U.S. PATENT DOCUMENTS

| | | | |
|---|---|---|---|
| 6,636,491 B1 | 10/2003 | Kari et al. | |
| 1,318,527 A1 | 5/2006 | Gaal et al. | |
| 7,042,855 B1* | 5/2006 | Gilchrist et al. | 370/328 |
| 1,316,337 A1 | 1/2007 | Wei et al. | |
| 1,311,891 A1 | 7/2010 | Gogic | |
| 2001/0033563 A1 | 10/2001 | Niemela et al. | |
| 2002/0075859 A1 | 6/2002 | Mizell et al. | |
| 2004/0185837 A1* | 9/2004 | Kim et al. | 455/414.3 |
| 2004/0246962 A1 | 12/2004 | Kopeikin et al. | |
| 2005/0059398 A1* | 3/2005 | Jaupitre et al. | 455/435.2 |
| 2005/0281216 A1 | 12/2005 | Varonen et al. | |
| 2006/0104262 A1* | 5/2006 | Kant et al. | 370/352 |
| 2006/0262736 A1* | 11/2006 | Dong et al. | 370/254 |

(Continued)

FOREIGN PATENT DOCUMENTS

| | | |
|---|---|---|
| CN | 101516110 A | 8/2009 |
| JP | 2005-217626 A | 8/2005 |

(Continued)

OTHER PUBLICATIONS

Technical Specification Group Services and System Aspects; System Improvements for Machine-Type Communications; (Release 10), 3GPP Standard; 3GPP TR 23.888, 3rd Generation Partnership Project (3GPP), Mobile Competence Centre ; 650, Route Des Lucioles ; F-06921 Sophia-Antipolis Cedex; France, No. VO.3.2, Mar. 22, 2010, XP050401986.

(Continued)

*Primary Examiner* — Joshua A Kading

(57) ABSTRACT

A machine type device for deployment in a wireless network includes a processing circuit operable to generate an application layer message and a request including information identifying the machine type device as capable of using a particular protocol stack. After radio resources are setup between the machine type device and the base station controller, the processing circuit is further operable to transmit the application layer message and a local wireless network alias to a base station controller, the local wireless network alias indicating the machine type device is capable of using the particular protocol stack.

34 Claims, 5 Drawing Sheets

(56) References Cited

U.S. PATENT DOCUMENTS

| | | | |
|---|---|---|---|
| 2007/0213058 A1* | 9/2007 | Shaheen | 455/436 |
| 2008/0095119 A1* | 4/2008 | Bachmann et al. | 370/332 |
| 2009/0156201 A1* | 6/2009 | Pudney et al. | 455/426.1 |
| 2009/0213792 A1* | 8/2009 | Lee | 370/328 |
| 2009/0262684 A1* | 10/2009 | Khetawat et al. | 370/328 |

FOREIGN PATENT DOCUMENTS

| | | |
|---|---|---|
| JP | 2006-260584 A | 9/2006 |
| JP | 2007-520901 A | 7/2007 |
| JP | 2010-035224 A | 2/2010 |
| JP | 2001-508276 A | 6/2011 |
| TW | I311891 | 7/2009 |
| TW | I316337 | 10/2009 |
| TW | I318527 | 12/2009 |

OTHER PUBLICATIONS

ZTE: "Group Identification in Overload Control", 3GPP Draft; S2-103127, 3rd Generation Partnership Project (3GPP), Mobile Competence Centre ; 650, Route Des Lucioles ; F-06921 Sophia-Antipolis Cedex; France, vol. SA WG2, No. Elbonia; 20100706, Jun. 29, 2010, XP050458213.

Erisson, ST-Ericsson; "Adding PS solution to online data"; 3GPP TSG SA WG2 Meeting #78, TD S2-101299, Feb. 22-16, 2010, San Francisco, USA.

NTT Docomo; Mapping of "Subscribed RFSP Index" and "RFSP Index in use"; GPP TSG SA WG2 Meeting #78, TD S2-101276, Feb. 22-26, 2010, San Francisco, USA.

* cited by examiner

MTC DEVICE BANDWIDTH REDUCTION

PRIORITY CLAIM

This application claims priority from U.S. Provisional Patent Application No. 61/326,495 filed on 21 Apr. 2010, the content of said application incorporated herein by reference in its entirety.

FIELD OF TECHNOLOGY

The present application relates to machine type communication devices, and in particular to handling machine type communication messages traversing a wireless network.

BACKGROUND

Machine-to-Machine (M2M) involves communication without or only limited human intervention. That is, people do not provide the input, but only optionally the output. The acronym 'MTC' is used herein to broadly refer to any type of machine-to-machine communication. MTC enables machines to communicate directly with one another and is typically enabled via several types of components. For example, an MTC device is a device capable of replying to a request for data contained within the device or transmitting data contained in the device autonomously. A communication network provides connectivity between MTC devices and MTC gateways. The communication network can be based on for example xDSL (digital subscriber line), LTE (3GPP Long Term Evolution), LTE advanced, WiMAX (worldwide interoperability for microwave access), WLAN (wireless local area network), etc. An MTC gateway employs MTC capabilities which ensure MTC devices interconnect to the communication network. An MTC communication network provides communications between an MTC gateway and an MTC application. An MTC application contains the middleware layer where data is processed by one or more applications supporting MTC services. Example applications for MTC services include machine type communications in smart power grid, smart metering, consumer products, health care, etc.

MTC traffic places a large capacity demand on wireless communication networks. In Rel-10, 3GPP ($3^{rd}$ generation partnership project) is in the process of establishing requirements for 3GPP network system improvements that support MTC. The objective of this study is to identify 3GPP network enhancements required to support a large number of MTC devices in the network and to provide necessary network enablers for MTC communication service. Specifically, transport services for MTC as provided by the 3GPP system and the related optimizations are under consideration as well as aspects needed to ensure that MTC devices, MTC servers and MTC applications do not cause network congestion or system overload. However, current mobile networks remain optimally designed for human-to-human communications and are thus less optimal for MTC applications.

For example, MTC devices are subject to legacy GPRS (general packet radio service) attach procedures such that the serving SGSN (serving GPRS support node) assigns each MTC device a 32 bit P-TMSI (packet temporary mobile subscriber identity) uniquely identifying the device as an MTC device within the scope of the service area (e.g. a routing area) in which the device became attached. Authentication and IMEI (international mobile equipment identity) check procedures are performed as necessary during the GPRS attach as per legacy procedures. These legacy procedures and others require an extensive amount of system bandwidth for MTC, which reduces the amount of bandwidth available for human-to-human communications. MTC bandwidth demand increases significantly as the number of MTC devices serviced by a network increases as is expected in the next several years.

SUMMARY

Certain protocol stack optimizations are provided for MTC devices to reduce the total volume of control plane and user plane payload sent when an MTC message requires transmission. These optimizations can include reducing or even eliminating some of the end-to-end signalling procedures such as MTC device-to-SGSN NAS (non-access stratum) signalling typically required for legacy mobile devices. Also, the number of protocol layers required in the protocol stack can be reduced and therefore the bandwidth needed when MTC application layer messages are transmitted to/from an MTC device over the radio interface.

The use of a packet data protocol (PDP) context activation procedure between an MTC device and SGSN can also be eliminated, reducing the amount of overhead NAS signalling required to prepare the MTC device for operation within a wireless communication network. In addition, carrying MTC messages within the context of UDP/IP (user datagram protocol/Internet protocol) datagrams between the SGSN and an MTC device can be eliminated, saving 46 to 48 octets of overhead for every MTC message. As such, MTC devices can transmit and/or receive MTC messages without the use of UDP/IP. Many MTC messages sent over the radio interface are about 60 octets or less in length in which case the elimination of the 48 octets of overhead yields a significant bandwidth reduction.

According to an embodiment, non-access stratum (NAS) layer messages are transmitted in a wireless network by setting up radio resources between a first network node and a base station controller responsive to a radio resource request received from the first network node and transmitting a non-access stratum (NAS) layer request from the first network node to the base station controller using the allocated radio resources and relaying the NAS layer request to a second network node. Operational parameters are established which correspond to a particular protocol stack using information identifying the first network node as capable of using the particular protocol stack, an access point name of a third network node and an address of a server to which an application in the first network node is to communicate via the second and third network nodes responsive to the NAS layer request being received at the second network node. Packet data protocol (PDP) context based connectivity is established from the second network node to the third network node. Use of the particular protocol stack is enabled at the second network node responsive to information provided by the NAS layer request and the PDP context based connectivity to the third network node. After the operational parameters corresponding to the particular protocol stack are established, application layer messages are forwarded between the first network node and the second network node in accordance with the particular protocol stack using radio resources between a first network node and a base station controller responsive to a subsequent radio resource request received from the first network node.

According to another embodiment, a base station controller for use in a wireless network includes a processing circuit operable to relay application layer messages from a first network node to a second network node based on a local wireless network alias sent in conjunction with the messages. The local wireless network alias indicates the first network node is capable of using a particular protocol stack and associated with a specific second network node.

According to yet another embodiment, non-access stratum (NAS) layer messages are transmitted in a wireless network by generating a NAS layer message at a first network node, setting up radio resources between the first network node and a base station controller responsive to a radio resource request generated by the first network node, and using the allocated radio resources to convey a non-access stratum (NAS) layer request from the first network node to a second network node. Operational parameters corresponding to a particular protocol stack are established using information identifying the first network node as capable of using the particular protocol stack and an address of a server to which an application in the first network node is to communicate via the second network node responsive to the NAS layer request. After the operational parameters corresponding to the particular protocol stack are established, application layer messages and a local wireless network alias are transmitted to the second network node via the base station controller, the local wireless network alias indicating the first network node is capable of using the particular protocol stack.

According to still another embodiment, a machine type device for deployment in a wireless network includes a processing circuit operable to generate an application layer message and a request including information identifying the machine type device as capable of using a particular protocol stack and after radio resources are setup between the machine type device and a base station controller, transmit the application layer message and a local wireless network alias to a network node. The local wireless network alias indicates the machine type device is capable of using the particular protocol stack.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
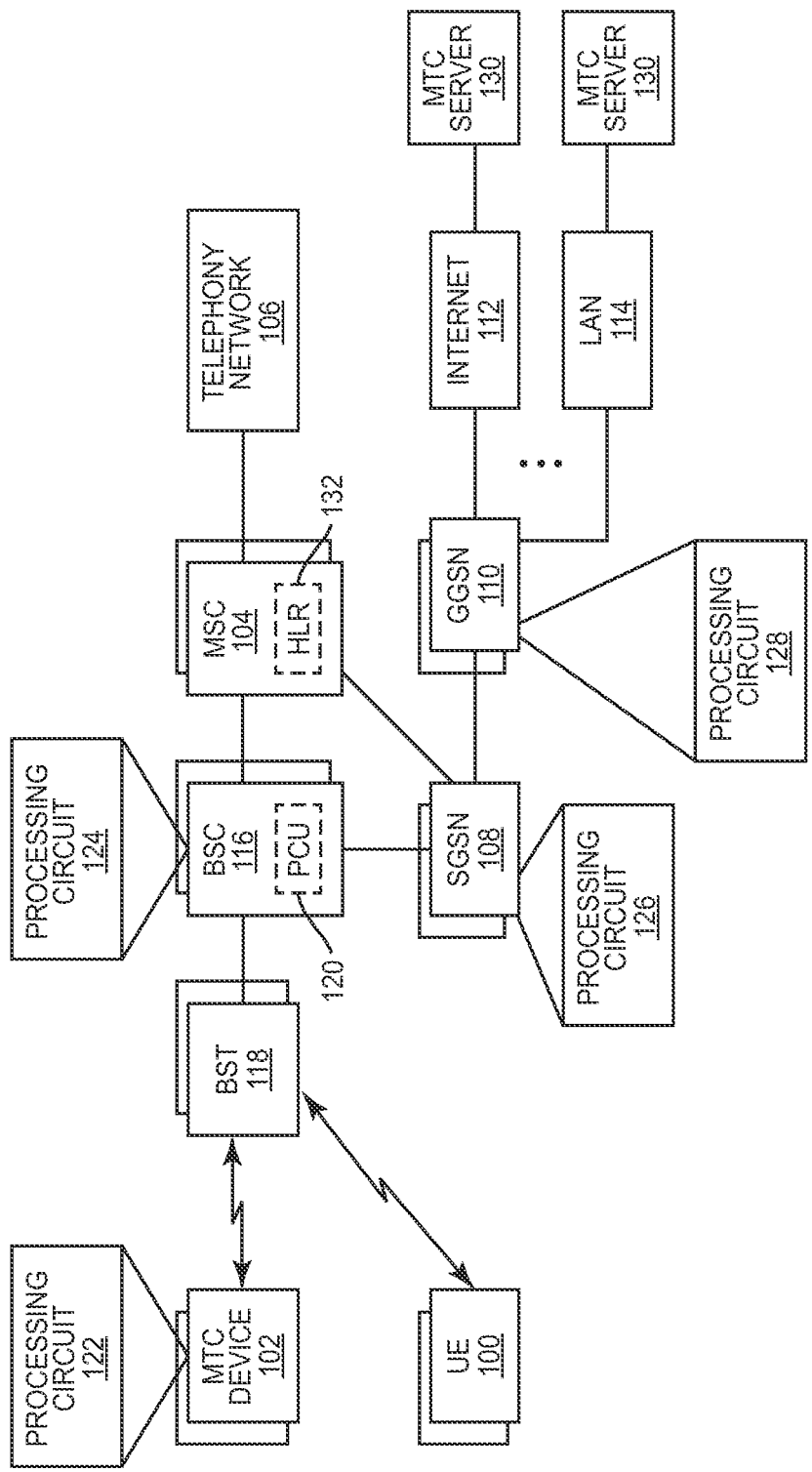
FIG. 1 illustrates a schematic block diagram of a wireless communication network which services MTC devices according to an embodiment.

FIG. 1 schematically illustrates an embodiment of a core radio network which services different types of devices such as user equipment (UE) 100 and MTC devices 102. For certain applications, an MTC device 102 can be a UE which operates in a machine-to-machine communication configuration. As such, the UEs in FIG. 1 are intended to represent mobile devices which are not presently operating in a MTC mode. In the circuit-switched domain, a mobile services center (MSC) server 104 forms part of the control layer. The MSC server manages voice-communications with a telephony network 106. In the packet-switched domain, a serving GPRS support node (SGSN) 108 and a gateway GPRS support node (GGSN) 110 form part of the connectivity layer and contain both control functionality and functionality for providing IP connectivity. The GGSN 110 provides an interface to one or more external networks such as the Internet 112, corporate local areas networks (LANs) 114, etc. The core radio network also includes a base station controller (BSC) 116 for managing radio resources. The BSC 116 controls the base station transceivers (BST) 118 of the radio network, which provide radio resources to the devices serviced by the network. The BSC 116 includes a packet control unit (PCU) 120 for handling GPRS packets. The PCU 120 manages the radio link control (RLC) and medium access control (MAC) layers over the radio interface, and the transfer of user data packets between the devices and the SGSN 108.

The MTC devices 102, BSC 116, SGSN 108 and GGSN 110 each include a respective processing circuit 122, 124, 126, 128 for performing the procedures described herein, and corresponding legacy functions. The respective processing circuits 122, 124, 126, 128 can include any type of hardware and/or software suitable for implementing these procedures. For example, the respective processing circuits 122, 124, 126, 128 may include one or more baseband processors, microprocessors, microcomputers, digital signal processors (DSPs), special-purpose hardware, such as an application specific integrated circuit (ASIC) and programmable logic devices, controllers, memory, firmware, software, and/or any combination thereof.

Figure 2:
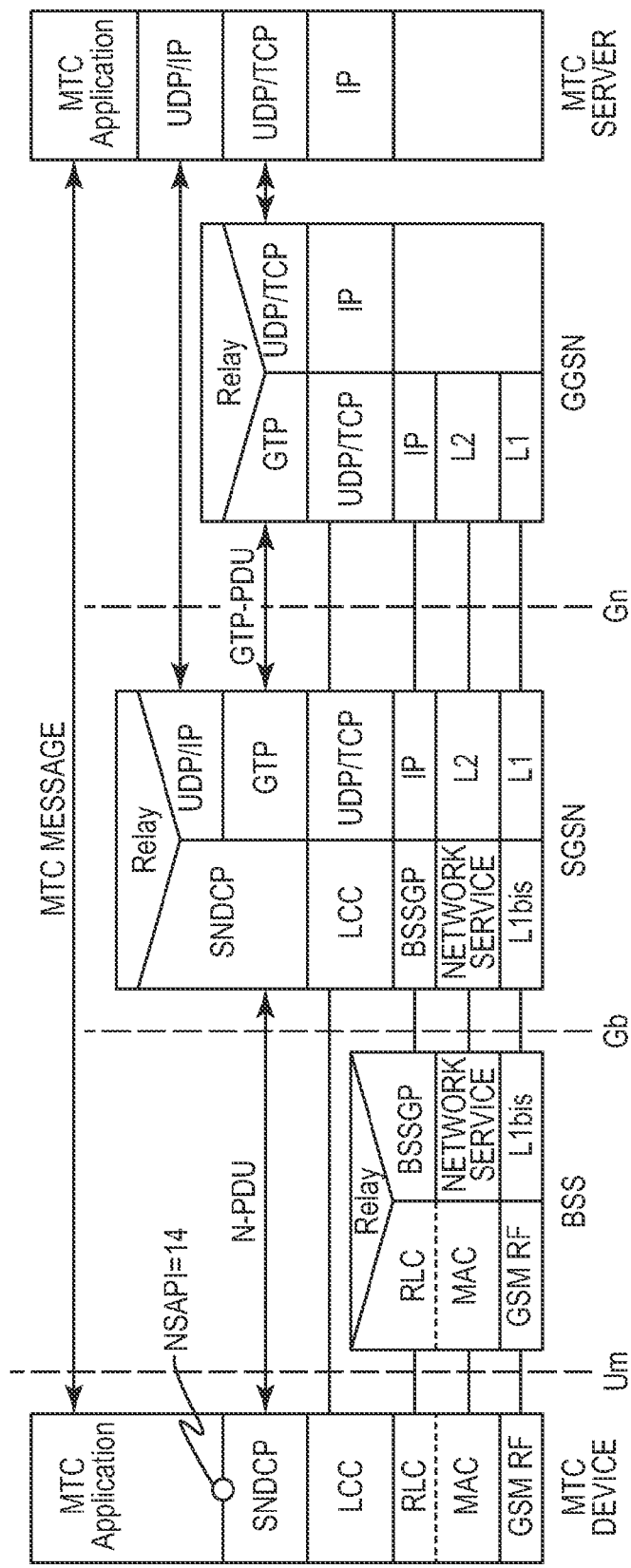
FIG. 2 illustrates protocol stack optimizations applied to application layer messages routed in a wireless communication network according to an embodiment.

FIG. 2 schematically illustrates an embodiment of the protocol stacks implemented by the different components of the core radio network, and the devices serviced by the network. Certain protocol stack optimizations are implemented for the MTC devices 102 in an attempt to reduce the total volume of user plane payload sent whenever an MTC message requires transmission. The protocol stack optimizations can include reducing the number of layers required in the protocol stack when MTC application layer messages are transmitted to/from an MTC device 102 over the radio interface. This in turn reduces the bandwidth needed to transmit such MTC messages.

In the uplink, an MTC device 102 sends a message addressed to an MTC server 130 which can be located within the radio network or be external to the network, e.g. connected to the Internet 112, corporate LAN 114, etc. Single block packet access allocations with protocol stack optimizations can be used for MTC message transmissions instead of using multiple radio blocks when a particular MTC application layer message is small enough to fit within a single radio block.

Figure 3:
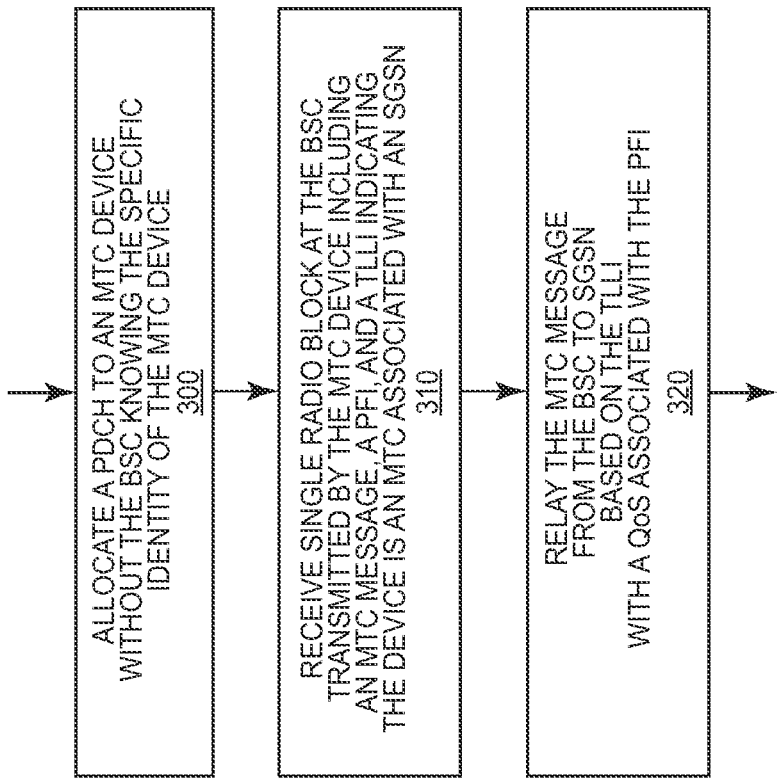
FIG. 3 illustrates a flow diagram of a method of routing an application layer message in a wireless communication network using a single radio block according to an embodiment.

FIG. 3 illustrates an embodiment of single block packet access for an MTC message. The application layer message is sent from the generating MTC device 102 to the SGSN 108 by the MTC device 102 sending a single block packet access request to the BSC 116 and the BSC 116 allocating a radio resource to the MTC device 102 in response without knowing the specific identity of the MTC device 102 (Step 300). For example, the BSC 116 can allocate a packet data channel (PDCH) to the MTC device 102 for transmission of the application layer message. The BSC 116 sends a message to the MTC device 102 indicating the single block packet access request is granted. In response, the MTC device 102 uses the allocated radio resource to transmit a single radio block containing the MTC message e.g. over the Um interface shown in FIG. 2 and which is received at the BSC 116 (Step 310). The single radio block includes an application layer message carried within an SN-PDU (encapsulated network protocol data unit) associated with the SubNetwork Dependent Convergence Protocol (SNDCP) layer, a packet flow identifier (PFI), and a local wireless network alias indicating the specific identity of the MTC device 102. In one embodiment, the local wireless network alias is a TLLI (temporary logical link identity) previously allocated to the MTC device 102 as described later herein. The BSC 116 then relays the MTC message, local wireless network alias and PFI to the SGSN 108 e.g. over the Gb interface shown in FIG. 2 based on the local wireless network alias and with a quality-of-service (QoS) associated with the PFI (Step 320).

The SGSN 108 in turn forwards the application layer message (MTC message) extracted from the single radio block to the GGSN 110 for transmission to the destination MTC server 130. The SGSN 108 forwards the MTC message to the GGSN 110 by recognizing the PFI is associated with an MTC device that supports a protocol stack optimized for MTC transmissions e.g. as shown in FIG. 2. In one embodiment, the protocol stack optimizations include the MTC device 102 eliminating the UDP/IP header from the MTC message protocol stack used over the radio interface e.g. as shown in FIG. 2. This permits the MTC device 102 to maximize the use of single block packet access allocations by the BSC 116 for relatively short MTC application layer messages of about 20 octets. The protocol stack implemented at the MTC device 102 can be further optimized by eliminating the UDP/IP header from the MTC message protocol stack used over the radio interface also as shown in FIG. 2. With these optimizations, less bandwidth is required to send application layer messages from the MTC devices 102 to the SGSN 108 via the BSC 116.

In response to recognizing the PFI included in the single radio block is associated with an MTC device 102 that supports a protocol stack optimized for MTC transmissions, the SGSN 108 maps the MTC application layer message into a GTP-U protocol data unit so that the application layer message is carried within a UDP/IP datagram constructed using a source PDP address assigned to the MTC device 102 and a destination PDP address assigned to the MTC server 130. The PDP addresses can be IP addresses, for example. The SGSN 108 then sends the GTP-U protocol data unit to the GGSN 110, and the GGSN 110 forwards the UDP/IP datagram to the corresponding MTC server 130 based on the corresponding PDP address.

Significant bandwidth reduction is realized by maximizing the use of single block packet access allocations in support of MTC devices. For example, if the payload of an MTC message is 7 octets or less such that it fits within a single SN-PDU having 4 octets of header/a single LLC (link layer control) PDU having 6 octets of header, then an MTC device 102 sends a CHANNEL REQUEST message to the BSC 116 that requests a single block packet access. In this case an uplink TBF (temporary block flow) is not established because the network grants only a single radio block period on the assigned packet uplink resource where the MTC device 102 sends an RLC (radio link control) data block carrying an LLC PDU. If GPRS coding schemes greater than CS-1 are allowed for RLC data blocks carrying application layer messages then the MTC device 102 can still send a CHANNEL REQUEST message that requests a single block packet access even when the MTC message payload is greater than 7 octets. For example, if the CS-2 coding scheme is allowed then MTC messages up to 17 octets long can be sent using the single block packet access procedure described above.

For cases where a single block packet access can be used, a savings of approximately 67% in the amount of signalling blocks sent in support of MTC message delivery can be realized. With single block packet access signalling, there is no TBF establishment. As such, the single block packet access request is transmitted from an MTC device 102 to the corresponding SGSN 108 by performing the following procedures: EGPRS Packet Channel Request (RACH)+Immediate Assignment (AGCH)+MTC Message (PDCH). In this case the MTC device requests a single block packet access and the assigned PDCH is used to send the MTC message without TBF establishment. The BSC 116 does not acknowledge the reception of the radio block containing the MTC message. Because of the potential for the uplink MTC message to be lost, this use case could be limited to MTC features considered by the MTC server 130 to be as "lossy" (i.e. loss-tolerant) which could be determined, for example, by activating an MTC device 102 using MTC device-to-MTC server signalling. This "lossy" attribute may be appropriate when large volumes of MTC devices are expected to send the same or similar MTC messages.

In the case of two phase access multi-block packet access signalling, data packets are transmitted from an MTC device 102 to the corresponding SGSN 108 by performing the following procedures: EGPRS Packet Channel Request (RACH)+Immediate Assignment (AGCH)+Packet Resource Request (PDCH)+Packet Uplink Assignment (PACCH)+MTC message (PDCH)+PACKET UPLINK ACK/NACK (PACCH)+PACKET CONTROL ACKNOWLEDGEMENT (PDCH). In the case of one phase access multi-block packet access signalling, data packets are transmitted from an MTC device 102 to the corresponding SGSN 108 by performing the following procedures: EGPRS Packet Channel Request (RACH)+Immediate Assignment (AGCH)+MTC message (PDCH)+PACKET UPLINK ACK/NACK (PACCH)+PACKET CONTROL ACKNOWLEDGEMENT (PDCH). In both cases an uplink TBF is established and released after the MTC message is sent using one or more radio blocks. If single block packet access is possible in, for example, 80% of the cases of MTC messages sent from MTC devices 102 then the signalling savings are approximately 67%*80%=54%, in average compared to a two phase access.

In addition to the protocol optimizations described above for single block packet access requests, further bandwidth reduction can be realized by eliminating PDP context activation between MTC devices 102 and the corresponding SGSNs 108. Given the signalling load concerns associated with MTC devices 102 in general and realizing that packet data transmissions associated with these types of devices do not require the range of QoS support offered to non-MTC devices such as UEs 100, eliminating PDP context activation procedures for these devices can be implemented. Doing so involves the BSC 116 identifying an access made by an MTC device 102 and thereby determining the corresponding QoS to be applied and a solution for the GGSN 110 no longer being able to assign a PDP address directly to the MTC device 102.

Figure 4:
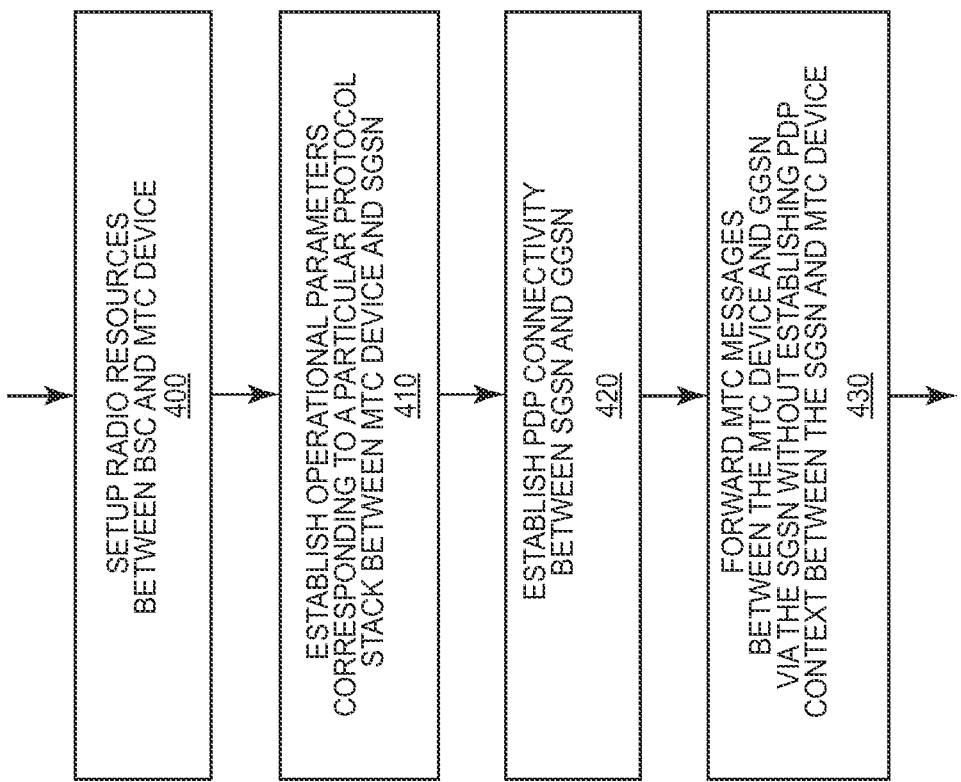
FIG. 4 illustrates a flow diagram of a method of routing application layer messages in a wireless communication network according to an embodiment.

FIG. 4 illustrates an embodiment of transmitting application layer messages in the wireless network without establishing PDP context between the sending MTC device 102 and the corresponding SGSN 108. The MTC device 102 generates a request to establish operational parameters corresponding to a particular protocol stack including information identifying the device 102 as capable of using a particular protocol stack optimized for MTC application layer messages. The request also identifies an access point name (APN) of the GGSN 110 and an address of the MTC server 130 to which an application in the MTC device 102 is to communicate via the SGSN 108 and the GGSN 110. A request for radio resources is first sent to the BSC 116 which decides whether to grant the request. If the request is granted, the BSC 116 sets up radio resources (e.g. a PDCH) between the MTC device 102 and the BSC 116 (Step 400). The MTC device 102 then uses the radio resources to send the SGSN 108 a request to establish operational parameters corresponding to a particular optimized protocol stack (Step 410). In response, the SGSN 108 establishes PDP context based connectivity between the SGSN 108 and the GGSN 110 (Step 420). Use of the particular protocol stack implemented by the MTC device 102 is enabled at the SGSN 108 responsive to information provided by the request to establish operational parameters corresponding to a particular protocol stack and the PDP context based connectivity to the GGSN 110. Doing so permits MTC application layer messages to be forwarded between the MTC device 102 and the SGSN 108 in accordance with this optimized protocol stack and between the SGSN 108 and the GGSN 110 without having to establish PDP context between the MTC device 102 and the SGSN 108 (Step 430).

PDP context activation can be eliminated between the MTC device 102 and the SGSN 108 by properly identifying the device 102 as an MTC device. When the MTC device 102 first powers on and attempts to become GPRS attached, the MTC device 102 has no P-TMSI and therefore no network resource identifier (NRI). As such a random MTC TLLI indicating the accessing device 102 is an MTC device can be introduced as highlighted in Table 1 below. The BSC 116 can route the initial NAS message (GPRS attach request) to the default SGSN 108 intended for serving MTC devices 102 based on the random MTC TLLI where this initial NAS message serves to trigger the establishment of operational parameters corresponding to a particular protocol stack. The P-TMSI assigned to the MTC device 102 can then be used as follows.

After the MTC device 102 becomes GPRS attached, the corresponding assigned P-TMSI can be used to construct a local MTC TLLI as highlighted in Table 1 below. The use of a local MTC TLLI indicates the accessing device is an MTC device 102 which allows the BSC 116 to route subsequent messages (e.g. Routing Area Update Request) to the default SGSN 108 intended for serving MTC devices 102. Device management can be simplified by isolating the P-TMSI space assignable to MTC devices 102 by not allowing MTC devices 102 and legacy type devices to share a common P-TMSI space. This can be accomplished by assigning MTC devices 102 a P-TMSI having the same 4 most significant bits as the local MTC TLLI as highlighted in Table 1 below. The 28 least significant bits of an assigned P-TMSI allow for up to 256 million unique MTC devices 102 to be supported within a specific geographical area (e.g. routing area) controlled by the corresponding SGSN 108. The NRI concept can still be used within the context of the P-TMSIs assigned to MTC devices 102 e.g. if there is a need to allow for potentially multiple SGSNs 108 to serve MTC devices 102.

Allowing the NRI field to identify the P-TMSI as belonging to an MTC device 102 is also possible. With the use of a random MTC TLLI, the introduction of a local MTC TLLI is accomplished and allows for using the NRI according to its historical purpose only i.e. not using the NRI to also identify MTC devices 102. For the case where an MTC device 102 determines it is no longer in the same routing area (RA) where it was assigned its current P-TMSI, the device 102 can revert back to using a random MTC TLLI when sending a routing area update message. This message includes the old P-TMSI so that the new default SGSN 108 intended for serving the MTC device 102 will, if different from the previous default SGSN 108, be able to determine the old SGSN 108. Using this approach regarding when a random MTC TLLI is to be used can avoid the introduction of a foreign MTC TLLI within Table 1 for MTC devices 102.

TABLE 1

Including New MTC TLLI structures

| 31 | 30 | 29 | 28 | 27 | 26 to 0 | Type of TLLI |
|----|----|----|----|----|---------|--------------|
| 1  | 1  | T  | T  | T  | T       | Local TLLI   |
| 1  | 0  | T  | T  | T  | T       | Foreign TLLI |
| 0  | 1  | 1  | 1  | 1  | R       | Random TLLI  |
| 0  | 1  | 1  | 1  | 0  | A       | Auxiliary TLLI |
| 0  | 1  | 1  | 0  | X  | X       | Reserved     |
| 0  | 1  | 0  | 0  | R  | R       | Random MTC TLLI |
| 0  | 1  | 0  | 1  | T  | T       | Local MTC TLLI |
| 0  | 0  | 0  | 0  | G  | G       | Part of the assigned G-RNTI |
| 0  | 0  | 0  | 1  | R  | R       | Random G-RNTI |

Figure 5:
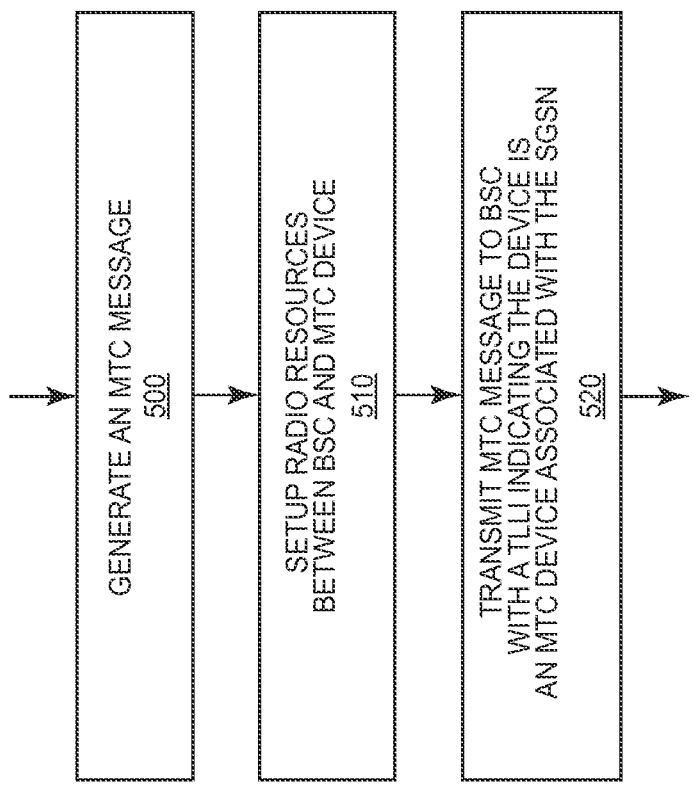
FIG. 5 illustrates a flow diagram of a method of routing application layer messages in a wireless communication network according to another embodiment.

FIG. 5 illustrates an embodiment of an MTC device 102 transmitting an application layer message in the wireless network. The MTC device 102 generates the application layer message (Step 500). Radio resources are setup between the MTC device 102 and the BSC 116 responsive to a request generated by the MTC 102 as previously described herein (Step 510). The request includes information identifying the MTC device 102 as capable of using a particular protocol stack optimized for MTC application layer messages. After the radio resources are setup between the MTC device 102 and the BSC 116, the MTC device 102 transmits the application layer message and the local MTC TLLI assigned to the MTC device 102 and a PFI associated with MTC application layer message to the BSC 116 (Step 520). The local MTC TLLI indicates to the BSC 116 that the MTC device 102 is capable of using the protocol stack optimized for MTC transmissions, and the BSC 116 relays the MTC message to the SGSN 108 responsible for the MTC device 102. The MTC message is transferred without PDP context establishment between the BSC 116 and the MTC device 102.

When an MTC device 102 does not make use of legacy PDP context establishment procedures, the device 102 cannot trigger the creation of PDP contexts. However, the need for associating a PDP address (e.g. an IP address) to the MTC device 102 and establishing a PDP address/APN pair at the GGSN 110 still remains as MTC messages sent from the MTC device 102 via the SGSN 108 to a specific MTC server 130 need to be routed using the appropriate APN and indicate the corresponding originating MTC device 102. This can be accomplished by the SGSN 108 triggering the create PDP context procedure toward the GGSN 110 following either a successful GPRS attach or just prior to sending an attach accept message to the MTC device 102. To this end, the MTC device 102 provides the SGSN 108 with the APN of the preferred GGSN 110 (e.g. the packet data network gateway) and the address of the corresponding MTC server 130 (e.g. in the form of a FQDN—fully qualified domain name) during the GPRS attach procedure by including this information as new information elements within the attach request message. Alternatively, the SGSN 108 can fetch this information from the (subscription based) HLR (home location register) 132 during the attachment procedure.

The inclusion of these new information elements within the attach request can serve to indicate the corresponding device is actually an MTC device 102 e.g. if the random MTC TLLI is not passed to the SGSN 108 during the attach procedure. The SGSN 108 then maps the APN into an IP address (e.g. using a DNS query) and triggers the create PDP context procedure to the corresponding GGSN 110 using legacy SGSN-to-GGSN procedures. The address of the MTC server 130 provided in the attach request or provided by the HLR 132 can also be mapped into an IP address by the SGSN 108 (e.g. using a DNS query) and used when MTC messages are subsequently received by the SGSN 108 and forwarded to the MTC server 130 via the PDN gateway (e.g. the GGSN 110).

When sending the GGSN 110 a create PDP context request, the SGSN 108 can include an indication that the corresponding device is an MTC device 102 e.g. using the protocol configuration options IE (information element) and thereby allow the GGSN 110 to realize that only a single PDP context is needed for the device and to take into account that the device is an MTC device 102 when assigning it a PDP Address (thereby establishing a PDP address/APN pair for that device). The PDP address assigned by the GGSN 110 during the create PDP context procedure is conveyed back to the SGSN 108 in the create PDP context response or as part of in-band signalling within user payload.

To ensure that an MTC device 102 only sends MTC messages when the GGSN 110 has established a corresponding PDP address/APN pair, the successful completion of the GPRS attach procedure could be made subject to the completion of the create PDP context procedure. In one embodiment, the attach accept message is only sent to the MTC device 102 when the create PDP context procedure is successfully completed between the SGSN 108 and the GGSN 110.

After completion of the attach and create PDP context procedures, the MTC device 102 can then send and receive MTC messages using a particular optimized protocol stack. To send an MTC message, the device 102 performs contention access and either single block or multi-block packet access allocations are used by the BSC 116 depending on the size of the MTC message requiring transmission, as previously described herein.

A lower layer alias, such as the local MTC TLLI derived from a P-TMSI assigned to the MTC device 102 during the attach procedure, conveyed from the MTC device 102 to the BSC 116 along with the MTC message as a result of a contention access is then relayed from the BSC 116 to the SGSN 108 along with the N-PDU carrying the MTC message. This allows the SGSN 108 to uniquely identify which MTC device 102 sent the application layer message. As shown in FIG. 2, the SGSN 108 acts as an endpoint for the UDP/IP protocol layers. That is, the SGSN 108 can map between the P-TMSI it allocated during the attach procedure and the PDP address assigned by the GGSN 110 during the create PDP context procedure. When the SGSN 108 receives an N-PDU from the BSC 116, the SGSN 108 looks at the corresponding P-TMSI and determines whether the P-TMSI is associated with an MTC device 102. If so, the SGSN 108 then maps the P-TMSI into the corresponding source IP address (PDP address) assigned by the GGSN 110 during the create PDP context procedure and uses the address of the corresponding MTC server 130 (also established during the create PDP context procedure) as the destination IP address. The SGSN 108 uses this information along with the UDP port number allocated for MTC messages and the TEIDs (tunnel endpoint identifiers) established for the MTC device 102 during the create PDP context procedure to create a GTP-U PDU carrying the MTC message (N-PDU) within a UDP/IP datagram and sends the UDP/IP datagram to the corresponding GGSN 110 e.g. over the Gn interface. That is, UDP/IP protocol layers are inserted by the SGSN 108.

Similarly, when the SGSN 108 receives a GTP-U PDU the SGSN 108 uses the TEID (GTP header), destination IP address (IP header) and UDP port (UDP header) to determine whether the GTP-U PDU carries an MTC message corresponding to an MTC device 102. If so, the SGSN 108 removes the MTC message from the UDP/IP datagram carried within the GTP-U PDU and relays the MTC message to the corresponding MTC device 102 as an N-PDU. That is, the UDP/IP protocol layers are removed by the SGSN 108.

Default UDP ports can be associated with the transmission of MTC messages. Accordingly, the SGSN 108 has sufficient information to map the MTC message (e.g. the N-PDU) received from the BSC 116 into a UDP/IP datagram and transmit the UDP/IP datagram to the corresponding GGSN 110 within a GTP-U PDU. The GGSN 110 in turn relays the payload of the GTP-U PDU (e.g. the MTC message/UDP/IP datagram) to the MTC server 130 as shown in FIG. 2. This results in saving 46 to 48 octets of overhead for every MTC message sent between an MTC device 102 and SGSN 108 as follows: 8 octets of IPv6 header (other than source and destination addresses); 16 octets (source IPv6 address); 16 octets (destination IPv6 address); and 6 to 8 octets (UDP header).

Given that the P-TMSI allocated to an MTC device 102 can allow the device to be uniquely identified as an MTC device 102 whenever a BSC 116 establishes either an uplink or downlink TBF for this type of device, the BSC 116 can then apply either an implementation specific, O&M (operation and maintenance) or other configured QoS (quality of service) management scheme for MTC devices 102. Doing so potentially allows the BSC 116 to apply QoS on a P-TMSI block basis as SGSNs 108 may assign P-TMSIs according to the set of one or more MTC features enabled for a group of MTC devices 102. In other words, an RRM (radio resource management) scheduler of the BSC 116 can manage MTC devices 102 such that different MTC device sub-groups (e.g. grouped together by their P-TMSI values) are managed in a distinct manner from a QoS perspective. In one embodiment, groups identified by P-TMSI can be managed by the RRM scheduler assigning one radio priority for all MTC devices 102 (i.e. a single QoS). Alternatively, the RRM scheduler can assign a radio priority on a finer granularity whereby different radio priorities can correspond to different blocks of P-TMSIs assignments e.g. effectively determined by the SGSN 108 at P-TMSI allocation and conveyed to the BSC 116 using implementation specific methods.

For the uplink case where a TBF is established, this approach to QoS management requires that contention resolution be complete so that RRM scheduler knows the identity of a specific MTC device 102 for which resource allocation is needed (i.e. ensuring the appropriate QoS is applied when an MTC message is sent using a TBF requires that RRM know the unique identity of the associated MTC device). An exception is when an MTC device 102 requests a single block packet access (e.g. channel request=01110xxx) and the assigned PDCH is used to send an MTC message (i.e. a TBF is not established) as previously described herein. In this case, the RRM scheduler can associate a pre-defined QoS for managing access requests consisting of a single block packet access since the RRM scheduler must decide whether to allocate a single PDCH without knowing the specific identity of the requesting MTC device 102.

Terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of transmitting application layer messages in a core radio network, comprising:
    allocating radio resources of the core radio network between a first network node and a base station controller included in the core radio network responsive to a radio resource request received from the first network node;
    transmitting a non-access stratum (NAS) layer request from the first network node to the base station controller using the allocated radio resources of the core radio network and relaying the NAS layer request to a second network node;
    establishing operational parameters based on the NAS layer request sent by the first network node using the allocated radio resources of the core radio network, the operational parameters corresponding to a particular protocol stack, wherein the establishing of the operational parameters uses information identifying the first network node as configured to use the particular protocol stack, an access point name of a third network node, and an address of a server to which an application in the first network node is to communicate via the second and third network nodes, and wherein the establishing of the operational parameters is responsive to the NAS layer request being received at the second network node;
    establishing packet data protocol (PDP) context based connectivity from the second network node to the third network node;
    enabling use of the particular protocol stack at the second network node responsive to information provided by the NAS layer request and the PDP context based connectivity to the third network node; and
    forwarding application layer messages between the first network node and the second network node in accordance with the particular protocol stack and without the establishment of a PDP context between the first and second network nodes.

2. The method of claim 1, wherein the radio resource request includes a random local wireless network alias identifying the first network node as supporting the particular protocol stack, the particular protocol stack excluding User Datagram Protocol (UDP) and Internet Protocol (IP) layers.

3. The method of claim 1, wherein the PDP context based connectivity is established between the second network node and the third network node after completion of attachment related signalling between the second network node and other network nodes except for sending an attach accept message from the second network node to the first network node.

4. The method of claim 1, wherein establishing the PDP context based connectivity between the second network node and the third network node comprises:
    mapping the access point name of the third network node to an IP address by the second network node;
    performing PDP context signalling between the second network node and the third network node using the access point name of the third network node; and
    enabling use of the particular protocol stack at the second network node based on Internet Protocol (IP) source address information provided by the third network node during PDP context signalling and IP destination address information corresponding to the server provided to the second network node within the NAS layer request or provided by a Home Location Register (HLR) during attachment related signalling.

5. The method of claim 1, wherein establishing the PDP context based connectivity between the second network node and the third network node comprises implementing a PDP context activation procedure between the second network node and the third network node including:
    sending a create PDP context request from the second network node directed to the third network node indicating the packet data connection is to be established for a wireless network node that supports the particular protocol stack; and
    receiving a create PDP context response at the second network node from the third network node identifying a PDP address assigned to the first network node by the third network node.

6. The method of claim 5, wherein a final step of attachment related signalling sent from the second network node to the first network node is completed after the PDP context activation procedure is completed between the second network node and the third network node.

7. The method of claim 1, wherein forwarding application layer messages between the first network node and the second network node comprises:
    conveying the application layer messages within the context of the particular protocol stack which excludes the User Datagram Protocol (UDP) and Internet Protocol (IP) layers;
    mapping the application layer messages received from the first network node at the second network node into a different protocol stack which includes the UDP and IP layers by using an IP address of the server and an IP address of the first network node identified when the NAS layer request was received and the PDP context based connectivity was established; and
    forwarding the application layer messages received at the second network node to the server via the third network node based on the IP address of the server.

8. The method of claim 1, wherein forwarding the application layer messages from the first network node to the second network node comprises:

receiving at the second network node a local wireless network alias for the first network node and a network-protocol data unit carrying an application layer message generated by the first network node;

identifying the first network node as supporting the particular protocol stack based on the local wireless network alias, the particular protocol stack excluding the User Datagram Protocol (UDP) and Internet Protocol (IP) layers;

mapping the application layer message carried within the network-protocol data unit to a GTP-U protocol data unit wherein the UDP and IP layers are present using a source PDP address assigned to the first network node by the third network node and a destination PDP address associated with the server; and sending the GTP-U protocol data unit from the second network node to the third network node.

9. The method of claim 8, wherein mapping the application layer message to the GTP-U protocol data unit comprises:

mapping a packet temporary mobile subscriber identity previously determined by the second network node for the first network node to the source PDP address;

identifying the destination PDP address corresponding to the packet temporary mobile subscriber identity based on server information obtained when the NAS layer request was received and when the PDP context based connectivity is established;

generating the GTP-U protocol data unit, wherein the application layer message is carried within a UDP/IP datagram constructed using the source and destination PDP addresses; and sending the GTP-U protocol data unit to the third network node.

10. The method of claim 1, wherein forwarding the application layer messages from the second network node to the first network node comprises:

determining a GTP-U protocol data unit received at the second network node carries an application layer message directed to the first network node based on a destination PDP address included in the GTP-U protocol data unit which is assigned to the first network node by the third network node when the PDP context based connectivity is established;

removing User Datagram Protocol (UDP) and Internet Protocol (IP) layers from a UDP/IP datagram carried within the GTP-U protocol data unit to produce a network-protocol data unit including the application layer message; and relaying the application layer message via the network-protocol data unit to the first network node.

11. The method of claim 1, wherein forwarding the application layer messages between the first network node and the second network node comprises relaying the application layer messages from the first network node to the second network node based on a local wireless network alias associated with the application layer messages which indicates the first network node is part of a specific group of wireless devices having common quality-of-service requirements.

12. The method of claim 11, wherein relaying the application layer messages from the first network node to the second network node comprises:

identifying which group the first network node is associated with based on a packet temporary mobile subscriber identity assigned to the first network node during an attachment procedure; and relaying the application layer messages from the first network node to the second network node based on the quality-of-service assigned to the identified group.

13. The method of claim 11, wherein the same quality-of-service is assigned to all wireless devices that support the particular protocol stack or a different quality-of-service is assigned to subsets of wireless devices that support the particular protocol stack based on an identity uniquely associated with each wireless device.

14. The method of claim 1, wherein forwarding the application layer messages from the first network node to the second network node comprises:

allocating a radio resource of the core radio network to the first network node responsive to a base station controller accepting a single block packet access request received from the first network node without the base station controller knowing the specific identity of the first network node;

receiving a single radio block at the base station controller which is transmitted by the first network node using the allocated radio resource of the core radio network, the single radio block including a single application layer message carried within an SN-PDU associated with the SubNetwork Dependent Convergence Protocol (SNDCP) layer, a packet flow identifier, and a local wireless network alias indicating the specific identity of the first network node; and relaying the single application layer message from the base station controller to the second network node based on the local wireless network alias and with a quality-of-service associated with the packet flow identifier.

15. The method of claim 14, wherein the second network node forwards the single application layer message to the third network node by:

mapping the single application layer message into a GTP-U protocol data unit so that the single application layer message is carried within a UDP/IP datagram constructed using a source PDP address assigned to the first network node and a destination PDP address assigned to the server, responsive to the second network node recognizing the packet flow identifier is associated with a first network node that supports the particular protocol stack; and sending the GTP-U protocol data unit from the second network node to the third network node.

16. A network node for use in a core radio network, the network node comprising a processing circuit operable to:

receive a non-access stratum (NAS) layer request from a first network node, wherein the NAS layer request is transmitted from the first network node to a base station controller included in the core radio network using radio resources of the core radio network allocated responsive to a radio resource request sent by the first network node to the base station controller and forwarding the NAS layer request from the base station controller to the network node;

establish operational parameters using information identifying the first network node as configured to use the particular protocol stack, an access point name of a third network node, and an address of a server to which an application in the first network node is to communicate via the network node and the third network node, wherein the operational parameters correspond to a particular protocol stack and wherein the establishing of the operational parameters is responsive to receiving the NAS layer request sent by the first network node using the allocated radio resources of the core radio network;

establish packet data protocol (PDP) context based connectivity from the network node to the third network node without the establishment of a PDP context between the network node and the first network node;

enable use of the particular protocol stack at the network node responsive to information provided by the NAS layer request and the PDP context based connectivity to the third network node; and forward application layer messages received from the first network node in accordance with the particular protocol stack to the third network node using radio resources of the core radio network allocated responsive to a subsequent radio resource request sent by the first network node to the base station controller.

17. The network node of claim 16, wherein the initial radio resource request includes a random local wireless network alias identifying the first network node as supporting the particular protocol stack, the particular protocol stack excluding User Datagram Protocol (UDP) and Internet Protocol (IP) layers.

18. The network node of claim 16, wherein the processing circuit is operable to establish the PDP context based connectivity between the network node and the third network node after completion of attachment related signalling between the network node and other network nodes except for sending an attach accept message from the network node to the first network node.

19. The network node of claim 16, wherein the processing circuit is operable to map the access point name of the third network node to an IP address, perform PDP context signalling between the network node and the third network node using the access point name of the third network node, and enable use of the particular protocol stack at the network node based on Internet Protocol (IP) source address information provided by the third network node during PDP context signalling and IP destination address information corresponding to the server provided to the network node within the NAS layer request or provided by a Home Location Register (HLR) during attachment related signalling.

20. The network node of claim 16, wherein the processing circuit is operable to send a create PDP context request from the network node directed to the third network node indicating the operational parameters are to be established for a wireless network node that supports the particular protocol stack and receive a create PDP context response at the network node from the third network node identifying a PDP address assigned to the wireless network node by the third network node.

21. The network node of claim 16, wherein the processing circuit is operable to receive the application layer messages within the context of the particular protocol stack which excludes the User Datagram Protocol (UDP) and Internet Protocol (IP) layers, map the application layer messages received from the first network node at the network node into a different protocol stack which includes the UDP and IP layers by using an IP address of the server and an IP address of the first network node identified when the PDP context based connectivity was established, and forward the application layer messages received at the network node to the server via the third network node based on the IP address of the server.

22. The network node of claim 16, wherein the processing circuit is operable to receive at the network node a local wireless network alias for the first network node and a network-protocol data unit carrying an application layer message generated by the first network node, identify the first network node as supporting the particular protocol stack based on the local wireless network alias, the particular protocol stack excluding the User Datagram Protocol (UDP) and Internet Protocol (IP) layers, map the application layer message carried within the network-protocol data unit to a GTP-U protocol data unit wherein the UDP and IP layers are present using a source PDP address assigned to the first network node by the third network node and a destination PDP address associated with the server, and send the GTP-U protocol data unit from the network node to the third network node.

23. The network node of claim 22, wherein the processing circuit is operable to map a packet temporary mobile subscriber identity (P-TMSI) previously determined by the network node for the first network node to the source PDP address, identify the destination PDP address corresponding to the P-TMSI based on server information obtained when the NAS layer request was received or provided by a Home Location Register (HLR) during attachment related signalling, generate the GTP-U protocol data unit, wherein the application layer message is carried within a UDP/IP datagram constructed using the source and destination PDP addresses, and send the UDP/IP datagram to the third network node.

24. The network node of claim 16, wherein the processing circuit is operable to determine a GTP-U protocol data unit received at the network node carries an application layer message directed to the first network node based on a destination PDP address included in the GTP-U protocol data unit which is assigned to the first network node by the third network node when the PDP context based connectivity is established, remove User Datagram Protocol (UDP) and Internet Protocol (IP) layers from a UDP/IP datagram carried within the GTP-U protocol data unit to produce a network-protocol data unit including the application layer message, and relay the application layer message via the network-protocol data unit to the first network node.

25. A base station controller for use in a core radio network, the base station controller comprising a processing circuit operable to relay application layer messages without User Datagram Protocol (UDP) and Internet Protocol (IP) layers from a first network node to a second network node using a radio resource of the core radio network allocated between the first network node and the base station controller, based on a local wireless network alias sent in conjunction with the messages which indicates the first network node is configured to use a particular protocol stack associated with the second network node, wherein each application layer message from the first network node excludes the UDP and IP layers, and wherein the particular protocol stack excludes establishment of a packet data protocol (PDP) context between the first and second network nodes.

26. The base station controller of claim 25, wherein the processing circuit is operable to allocate the radio resource of the core radio network to the first network node responsive to accepting a single block packet access request received from the first network node without knowing the specific identity of the first network node, receive a single radio block transmitted by the first network node using the allocated radio resource of the core radio network, the single radio block including an application layer message carried within an SN-PDU associated with the SubNetwork Dependent Convergence Protocol (SNDCP) layer, a packet flow identifier, and the local wireless network alias which indicates the specific identity of the first network node, and relay the application layer message from the base station controller to the second network node based on the local wireless network alias and with a quality-of-service associated with the packet flow identifier.

27. The base station controller of claim 25, wherein the local wireless network alias indicates the first network node is part of a specific group of wireless devices having common quality-of-service requirements.

28. The base station controller of claim 27, wherein the processing circuit is operable to identify which group the first network node is associated with based on a local wireless network alias uniquely corresponding to a packet temporary mobile subscriber identity assigned to the first network node during an attachment procedure and relay the application layer messages from the first network node to the second network node based on the quality-of-service assigned to the identified group.

29. A method of transmitting application layer messages in a core radio network, comprising:
generating an application layer message at a first network node without including User Datagram Protocol (UDP) and Internet Protocol (IP) layers in the application layer message;
allocating radio resources of the core radio network between the first network node and a base station controller included in the core radio network responsive to a radio resource request generated by the first network node;
using the allocated radio resources of the core radio network to convey a non-access stratum (NAS) layer request from the first network node to a second network node;
establishing operational parameters based on a request sent by the first network node using the allocated radio resources of the core radio network, the operational parameters corresponding to a particular protocol stack, using information identifying the first network node as configured to use the particular protocol stack and an address of a server to which an application in the first network node is to communicate via the second network node responsive to the NAS layer request; and
after establishing operational parameters corresponding to the particular protocol stack, transmitting the application layer message without UDP/IP layers and with a local wireless network alias from the first network node to the second network node via the base station controller using radio resources of the core radio network allocated responsive to a subsequent radio resource request sent by the first network node to the base station controller, the local wireless network alias indicating the first network node is configured to use the particular protocol stack that excludes establishment of a packet data protocol (PDP) context between the first and second network nodes.

30. The method of claim 29, wherein transmitting the application layer message without UDP/IP layers and with the local wireless network alias from the first network node to the second network node via the base station controller comprises:
generating an application layer message at the first network node carried within an SN-PDU associated with a SubNetwork Dependent Convergence Protocol (SNDCP) layer, a packet flow identifier, and the local wireless network alias which indicates the specific identity of the first network node;
sending a single block packet access request from the first network node to the base station controller;
receiving a message at the first network node indicating the single block packet access request is granted by the base station controller; and
transmitting the application layer message from the first network node to the base station controller using a radio resource of the core radio network allocated by the base station controller for the single block packet access without establishing a temporary block flow with the base station controller.

31. The method of claim 30, wherein generating the application layer message comprises:
generating the local wireless network alias based on a packet temporary mobile subscriber identity determined by the second network node for the first network node during an attach procedure; and
generating a network-protocol data unit carrying the application layer message.

32. A machine device for deployment in a core radio network, the machine device comprising a processing circuit operable to:
generate an application layer message and a request including information identifying the machine device as configured to use a particular protocol stack that excludes establishment of a packet data protocol (PDP) context between the machine device and a second network node, wherein each application layer message excludes User Datagram Protocol (UDP) and Internet Protocol (IP) layers; and
after radio resources of the core radio network are allocated between the machine device and a base station controller included in the core radio network, transmit the application layer message without UDP/IP layers and with a local wireless network alias to the base station controller using the radio resources of the core radio network allocated between the machine device and the base station controller, the local wireless network alias indicating the machine device is configured to use the particular protocol stack.

33. The machine device of claim 32, wherein the processing circuit is operable to generate an application layer message carried within an SN-PDU associated with a Sub-Network Dependent Convergence Protocol (SNDCP) layer, a packet flow identifier, and the local wireless network alias which indicates the specific identity of the machine device, send a single block packet access request to the base station controller, receive a message indicating the single block packet access request is granted by the base station controller, and transmit the application layer message to the base station controller using a radio resource of the core radio network allocated by the base station controller for the single block packet access without establishing a temporary block flow with the base station controller.

34. The machine device of claim 33, wherein the processing circuit is operable to generate the local wireless network alias based on a packet temporary mobile subscriber identity determined by the network node for the machine device during an attach procedure and generate a network-protocol data unit carrying the application layer message.

* * * * *